United States Patent
Lee et al.

(10) Patent No.: US 9,291,117 B2
(45) Date of Patent: Mar. 22, 2016

(54) METHOD AND SYSTEM FOR CONTROLLING LOW PRESSURE FUEL PUMP OF GASOLINE DIRECT INJECTION ENGINE

(71) Applicants: Hyundai Motor Company, Seoul (KR); Kia Motors Corporation, Seoul (KR)

(72) Inventors: Bumky Lee, Suwon-si (KR); Heesup Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 308 days.

(21) Appl. No.: 13/946,910

(22) Filed: Jul. 19, 2013

(65) Prior Publication Data

US 2014/0165970 A1   Jun. 19, 2014

(30) Foreign Application Priority Data

Dec. 17, 2012   (KR) ........................ 10-2012-0147802

(51) Int. Cl.
  *F02D 41/22*    (2006.01)
  *F02D 41/38*    (2006.01)
  *F02D 41/30*    (2006.01)
  *F02D 41/14*    (2006.01)

(52) U.S. Cl.
  CPC .......... *F02D 41/3854* (2013.01); *F02D 41/221* (2013.01); *F02D 41/3082* (2013.01); *F02D 41/3863* (2013.01); *F02D 2041/1409* (2013.01); *F02D 2041/1418* (2013.01); *F02D 2041/226* (2013.01); *F02D 2041/227* (2013.01); *F02D 2200/0602* (2013.01); *F02D 2250/31* (2013.01); *Y02T 10/40* (2013.01)

(58) Field of Classification Search
  CPC ..... F02D 1/06; F02D 41/221; F02D 41/3854; F02D 41/3082; F02D 2041/226; F02D 41/3863
  USPC ........... 123/446, 456, 457, 510, 511; 701/104
  See application file for complete search history.

(56) References Cited

U.S. PATENT DOCUMENTS 8,820,299 B2 *   9/2014   Kojima ......................... 123/457
2015/0144108 A1 *   5/2015   Kim et al. ............... F02D 41/36

FOREIGN PATENT DOCUMENTS

JP   2012-229674 A   11/2012

* cited by examiner

*Primary Examiner* — Hai Huynh
(74) *Attorney, Agent, or Firm* — Morgan, Lewis & Bockius LLP

(57) ABSTRACT

A method of controlling a low pressure fuel pump of a gasoline direct injection (GDI) engine includes receiving failure related information of a high pressure fuel pump, boosting, if the high pressure fuel pump is failed based on the failure related information of the high pressure fuel pump, a fuel pressure of the low pressure fuel pump to a setting pressure and controlling, if the high pressure fuel pump is not failed, the fuel pressure of the low pressure fuel pump based on a measured fuel pressure with respect to a target fuel pressure of the high pressure fuel pump or a change of a control value of the GDI engine. A corresponding control system includes a fuel supply pressure controller, among other components, which is operated by a predetermined program for executing the method of controlling the low pressure fuel pump of the GDI engine.

6 Claims, 3 Drawing Sheets

METHOD AND SYSTEM FOR CONTROLLING LOW PRESSURE FUEL PUMP OF GASOLINE DIRECT INJECTION ENGINE

CROSS-REFERENCE TO RELATED APPLICATION

The present application claims priority of Korean Patent Application Number 10-2012-0147802, filed Dec. 17, 2012, the entire contents of which application are incorporated herein for all purposes by this reference.

BACKGROUND OF INVENTION

1. Field of Invention

The present invention relates to a method and system for controlling a low pressure fuel pump of a gasoline direct injection (GDI) engine for controlling a supply pressure of fuel in a GDI engine for directly injecting fuel into a combustion chamber.

2. Description of Related Art

A GDI engine is a gasoline engine for directly injecting fuel into a combustion chamber, and in order to directly inject fuel into a combustion chamber, the GDI engine boosts again a pressure of fuel that is supplied from a low pressure fuel pump that is installed in a fuel tank at a high pressure fuel pump and supplies the fuel to an injector.

The GDI engine forms a GDI engine system by combining a high pressure system that is formed with a high pressure adjustment valve, a high pressure fuel pump, a pressure sensor, and an injector and a low pressure system that is formed with a low pressure fuel pump, a fuel pump controller, and a fuel pressure sensor.

In the GDI engine system, because fuel should be injected in a high pressure into a combustion chamber, the fuel supply system further compresses the fuel in the high pressure system that has been primarily compressed in the low pressure system. Fuel that is compressed in the high pressure system is directly injected into a combustion chamber through an injector.

The GDI engine system is classified into a variable flow control method GDI engine system and a fixed flow method GDI engine system. FIG. 1 is a schematic diagram of a fuel pump controller that is applied to the variable flow control method GDI engine system.

The variable flow control method GDI engine system performs a flow control of a low pressure fuel pump with a proportional, integral, and derivative (PID) feedback control method based on a target fuel pressure value that receives from an engine control unit (ECU) and an actually measured fuel pressure value that is measured in a low pressure fuel pump.

Therefore, a flow amount that is supplied from a low pressure fuel pump of the variable flow control method GDI engine system is supplied only by the sum of a fuel pump driving minimum fuel amount and a consumed amount necessary for a given engine.

Such a variable flow control method can minimize a current amount that consumes in a fuel pump, compared with a fixed flow method of always supplying a maximum fuel amount and can obtain a fuel consumption enhancement effect.

When an almost entire segment of a general driving area is driven with a fuel pressure (e.g., 2.5 bar) of a relatively low pressure fuel pump, a vehicle to which the variable flow control method GDI engine system is applied can maximize a fuel consumption enhancement effect.

However, in some driving condition, when a fuel pressure of the low pressure fuel pump is maintained to be low, shortage of a start acceleration feeling, lighting of an engine warning lamp, and in the worst case, turn-off of starting may occur.

In order to solve such a problem, when a failure of a high pressure fuel pump is sensed, when a vehicle travels in an extremely high temperature, when a vehicle travels in an extremely low temperature, and when a vehicle travels at an extremely high region, conventional methods usually set a relatively high value (e.g., 5.0 bar) for a target fuel pressure of the low pressure side.

Although conventional methods may solve a problem when the high pressure fuel pump is actually failed, they do not solve a problem when a high pressure side fuel pressure control is failed or when a high pressure side fuel pressure control failure is estimated or detected.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present disclosure has been made in an effort to provide a method and system for controlling a low pressure fuel pump of a GDI engine having advantages of stably supplying fuel by boosting a low pressure side fuel pressure when a high pressure side fuel pressure drops to a predetermined value or less by enabling a GDI engine system to monitor a high pressure side fuel pressure in real time.

The present disclosure further provide a method and system for controlling a low pressure fuel pump of a GDI engine having advantages of stably supplying fuel by boosting a low pressure side fuel pressure for a predetermined time by preventively or preemptively detecting a symptom of a high pressure side pressure drop that is determined in various traveling modes and test conditions.

Various aspects of the present disclosure provide a method of controlling a low pressure fuel pump of a gasoline direct injection (GDI) engine. The GDI engine comprises a low pressure system having a low pressure fuel pump and a high pressure system having a high pressure fuel pump, and a fuel primarily compressed in the low pressure system is secondarily compressed in the high pressure system and injected to a combustion chamber through an injector. The method include receiving an input of failure related information of the high pressure fuel pump, boosting, if the high pressure fuel pump is failed based on the failure related information of the high pressure fuel pump, a fuel pressure of the low pressure fuel pump to a first setting pressure (AP pressure), and controlling, if the high pressure fuel pump is not failed, the fuel pressure of the low pressure fuel pump based on a measured fuel pressure with respect to a target fuel pressure of the high pressure fuel pump or a change of a control value of the GDI engine.

The controlling of the fuel pressure of the low pressure fuel pump may include boosting, if a difference between the measured fuel pressure and the target fuel pressure of the high pressure fuel pump is equal to or lager than a predetermined value, the fuel pressure of the low pressure fuel pump to a second setting pressure (BP pressure).

The control value of the GDI engine may be a control value of a spill valve, and the controlling of the fuel pressure of the low pressure fuel pump may include boosting, when the control value of the spill valve is equal to or lager than a predetermined value, the fuel pressure of the low pressure fuel pump to a third setting pressure (CP pressure). The control value of the spill valve may be an integral gain value.

Other aspects of the present disclosure provides a low pressure fuel pump control system of a GDI engine. The GDI engine comprises a low pressure system having a low pressure fuel pump and a high pressure system having a high pressure fuel pump, and a fuel primarily compressed in the low pressure system is secondarily compressed in the high pressure system and injected to a combustion chamber through an injector. The low pressure fuel pump control system includes an engine control unit that controls the GDI engine, a low pressure fuel pump pressure sensor that detects a fuel pressure of the low pressure fuel pump, a high pressure fuel pump pressure sensor that detects a fuel pressure of the high pressure fuel pump, a spill valve that controls the injection timing of the fuel, and a fuel supply pressure controller that controls the fuel pressure of the low pressure fuel pump according to a state of the high pressure fuel pump and a control state of the GDI engine, wherein the fuel supply pressure controller is operated by a predetermined program including a series of commands for executing any method of controlling the low pressure fuel pump of the GDI engine such as those disclosed in the present application.

With methods and systems of the present disclosure, in a fuel supply system of a GDI engine that is formed with a low pressure system and a high pressure system, fuel consumption of a vehicle can be enhanced.

Further, with methods and systems of the present disclosure, a GDI engine system monitors a high pressure side fuel pressure in real time, and when a high pressure side fuel pressure drops to a predetermined value or less, the GDI engine system boosts a low pressure side fuel pressure, thereby stabilizing fuel supply.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In addition, unless explicitly described to the contrary, the word "comprise" and variations such as "comprises" or "comprising", will be understood to imply the inclusion of stated elements but not the exclusion of any other elements.

Figure 1:
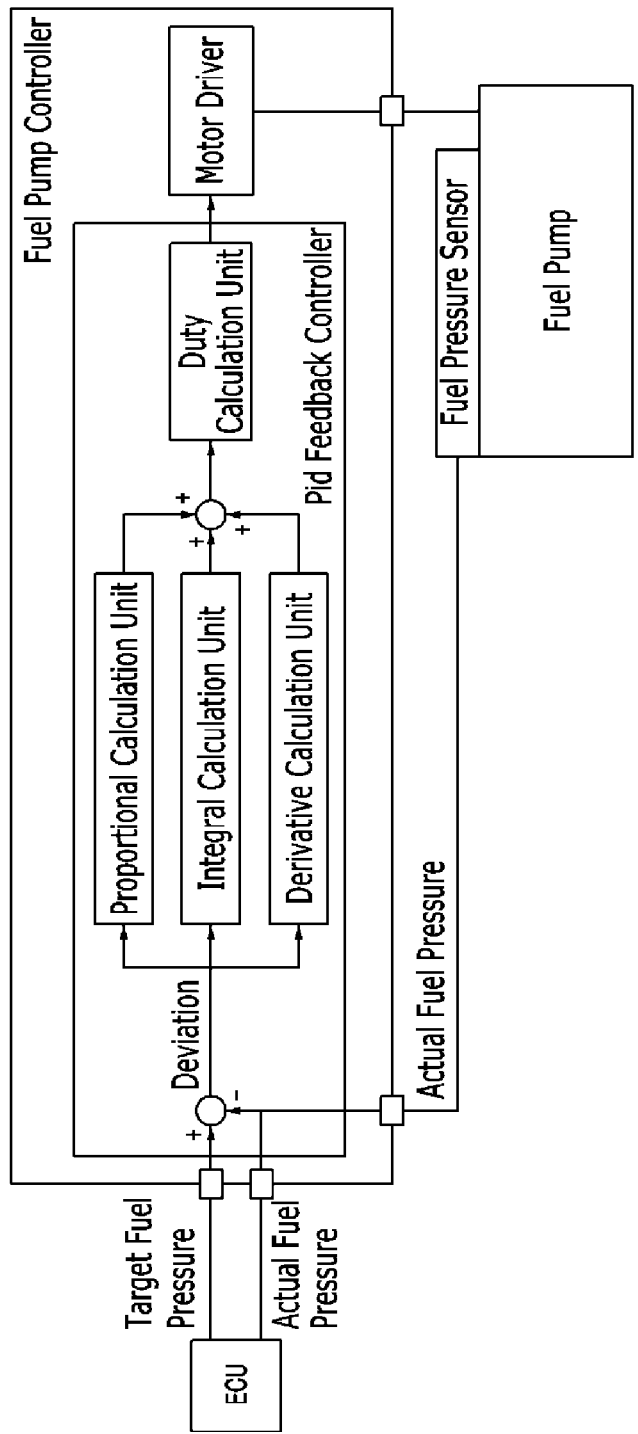
FIG. 1 is a block diagram illustrating a general GDI engine system.
Figure 2:
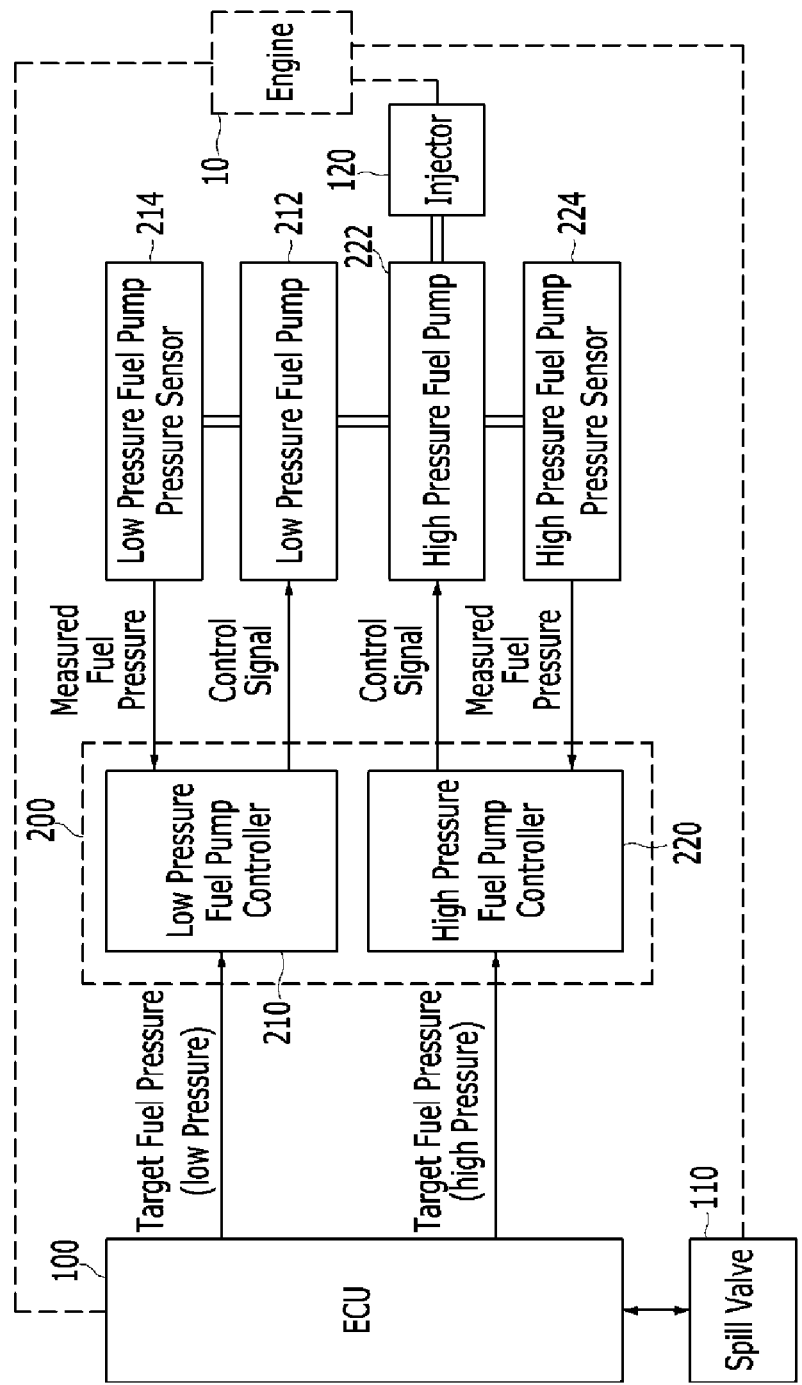
FIG. 2 is a block diagram illustrating an exemplary low pressure fuel pump control system of a GDI engine according to the present disclosure.

FIG. 2 is a block diagram illustrating an exemplary low pressure fuel pump control system of a GDI engine according to various embodiments of the present disclosure. The low pressure fuel pump control system of a GDI engine is a system that controls a supply pressure of fuel in a GDI engine that directly injects fuel into a combustion chamber.

A low pressure fuel pump control system of a GDI engine according to various embodiments of the present disclosure includes an engine control unit 100 that controls a GDI engine 10; a low pressure fuel pump pressure sensor 214 that detects a fuel pressure of a low pressure fuel pump 212; a high pressure fuel pump pressure sensor 224 that detects a fuel pressure of a high pressure fuel pump 222; a spill valve 110 that controls injection timing of fuel; an injector 120 that injects fuel; and a fuel supply pressure controller 200 that controls a fuel pressure of the low pressure fuel pump 212 according to a state of the high pressure fuel pump 222 and a control state of the GDI engine 10.

In FIG. 2, constituent elements other than the fuel supply pressure controller 200 are included in a general GDI engine system and therefore a detailed description thereof will be omitted.

The fuel supply pressure controller 200 includes a low pressure fuel pump controller 210 and a high pressure fuel pump controller 220. The fuel supply pressure controller 200 includes at least one microprocessor and/or hardware operating a predetermined program. The predetermined program may be formed with a series of commands for performing a method of controlling a low pressure fuel pump of a GDI engine according to various embodiments of the present application disclosed herein.

That is, the fuel supply pressure controller 200 may be formed in a module form in which a program and hardware are combined. For example, the fuel supply pressure controller 200 may be a microprocessor, electric and electronic components, and a PCB that mounts a memory element (ROM, RAM) in which a method of the present application disclosed herein is stored as a program.

Hereinafter, a method of controlling a low pressure fuel pump of a GDI engine according to various embodiments of the present disclosure will be described in detail with reference to the attached drawings.

Figure 3:
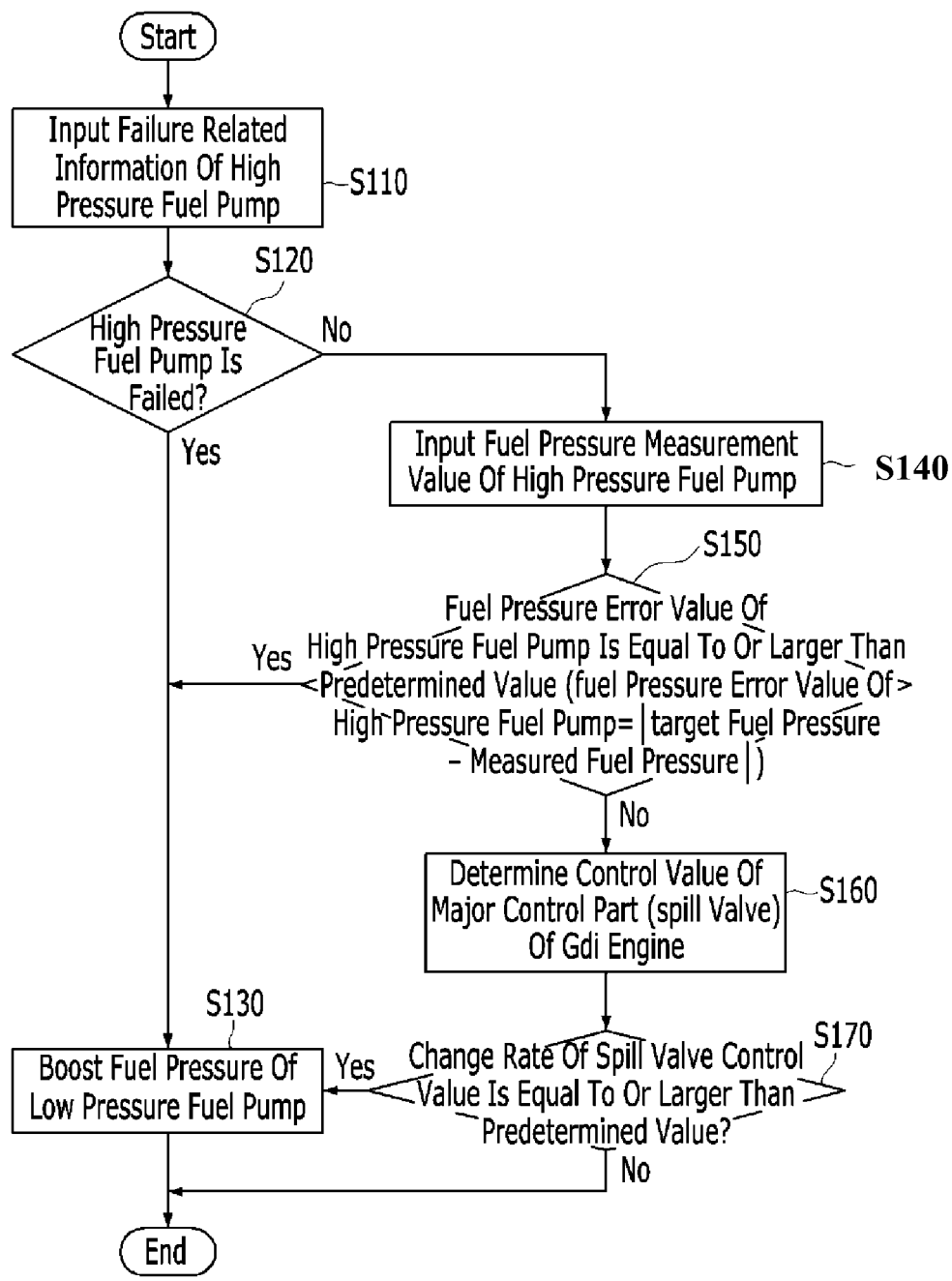
FIG. 3 is a flowchart illustrating an exemplary method of controlling a low pressure fuel pump of a GDI engine according to the present disclosure.

FIG. 3 is a flowchart illustrating an exemplary method of controlling a low pressure fuel pump of a GDI engine according to the present disclosure. As shown in FIG. 3, a fuel supply pressure controller 200 receives an input of failure related information of a high pressure fuel pump 222 (S110). The fuel supply pressure controller 200 receiving an input of failure related information of the high pressure fuel pump 222 may be performed using any standard or conventional method.

The fuel supply pressure controller 200 determines whether the high pressure fuel pump 222 is failed based on the input failure related information of the high pressure fuel pump (S120).

If the high pressure fuel pump 222 is failed, the fuel supply pressure controller 200 boosts a fuel pressure of the low pressure fuel pump 212 (S130), which may be performed using any standard or conventional method. At step S130, the fuel supply pressure controller 200 may boost a fuel pressure of the low pressure fuel pump 212, for example, from 2.5 bar to 5.0 bar.

If the high pressure fuel pump 222 is not failed at step S120, the fuel supply pressure controller 200 receives an input of a fuel pressure of the high pressure fuel pump 222 that is measured by the high pressure fuel pump pressure sensor 224 (S140).

When the measured fuel pressure of the high pressure fuel pump 222 is input to the fuel supply pressure controller 200, the fuel supply pressure controller 200 calculates a difference value (or an error value) between a target fuel pressure that is input from the engine control unit 100 and the measured fuel pressure and determines whether the difference value is equal to or larger than a predetermined value (e.g., 10 bar) (S150). The error value is a fuel pressure error value of the high pressure fuel pump and is a difference value between the target fuel pressure and the measured fuel pressure.

If the difference value is equal to or larger than a predetermined value, the control of the high pressure fuel pump 222 is not normally performed and thus a fuel pressure drops. Therefore, the fuel supply pressure controller 200 boosts a fuel pressure of the low pressure fuel pump 212 through the low pressure fuel pump controller 210 (S130).

Even when the measured fuel pressure of the high pressure fuel pump 222 is a predetermined value (e.g., 30 bar) or less, the fuel supply pressure controller 200 boosts a fuel pressure of the low pressure fuel pump 212.

If the error value is less than a predetermined value at step S150, the fuel supply pressure controller 200 determines a control value of a major control part (e.g., a spill valve) of the GDI engine 10 through the engine control unit 100 (S160). The major control part of the GDI engine 10 may be, for example, a spill valve 110. The control value of the spill valve 110 may be an integral control gain value.

The reason why the fuel supply pressure controller 200 determines an integral control gain value of the spill valve 110 at step S160 is that when a change rate of the integral control gain value of the spill valve 110 is larger than a predetermined value (e.g., common control level change rate value), it represents a symptom in which a failure occurs in a high pressure side fuel pressure control.

After the fuel supply pressure controller 200 determines the control value of the spill valve 110 at step S160, the fuel supply pressure controller 200 determines whether a change rate of the control value is equal to or larger than the predetermined value (S170).

If a change rate of the control value is equal to or larger than the predetermined value, this represents a symptom in which a failure occurs in a high pressure side fuel pressure control and therefore, the fuel supply pressure controller 200 boosts a fuel pressure of the low pressure fuel pump 212 through the low pressure fuel pump controller 210 (S130).

Thereby, methods and systems disclosed in the present application, while improving fuel consumption, provide the fuel to a GDI engine in a stable pressure.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A method of controlling a low pressure fuel pump of a gasoline direct injection (GDI) engine, wherein the GDI engine comprises a low pressure system having a low pressure fuel pump and a high pressure system having a high pressure fuel pump, wherein a fuel primarily compressed in the low pressure system is secondarily compressed in the high pressure system and injected to a combustion chamber through an injector, the method comprising:
   receiving an input of failure related information of the high pressure fuel pump;
   boosting, when the high pressure fuel pump is failed based on the failure related information of the high pressure fuel pump, a fuel pressure of the low pressure fuel pump to a first setting pressure; and
   controlling, when the high pressure fuel pump is not failed, the fuel pressure of the low pressure fuel pump based on a measured fuel pressure with respect to a target fuel pressure of the high pressure fuel pump or a change of a control value of the GDI engine,
   wherein the control value of the GDI engine is a control value of a spill valve, and
   wherein the controlling of the fuel pressure of the low pressure fuel pump comprises boosting, when the control value of the spill valve is equal to or lager than a predetermined value, the fuel pressure of the low pressure fuel pump to a second setting pressure.

2. The method of claim 1, wherein the controlling of the fuel pressure of the low pressure fuel pump comprises boosting, when a difference between the measured fuel pressure and the target fuel pressure of the high pressure fuel pump is equal to or lager than a predetermined value, the fuel pressure of the low pressure fuel pump to a a third setting pressure.

3. The method of claim 1, wherein the control value of the spill valve is an integral gain value.

4. A low pressure fuel pump control system of a gasoline direct injection (GDI) engine, wherein the GDI engine comprises a low pressure system having a low pressure fuel pump and a high pressure system having a high pressure fuel pump, wherein a fuel primarily compressed in the low pressure system is secondarily compressed in the high pressure system and injected to a combustion chamber through an injector, the low pressure fuel pump control system comprising:
   an engine control unit controlling the GDI engine;
   a low pressure fuel pump pressure sensor detecting a fuel pressure of the low pressure fuel pump;
   a high pressure fuel pump pressure sensor detecting a fuel pressure of the high pressure fuel pump;
   a spill valve controlling an injection timing of the fuel; and
   a fuel supply pressure controller controlling the fuel pressure of the low pressure fuel pump according to a state of the high pressure fuel pump and a control state of the GDI engine,
   wherein the fuel supply pressure controller is operated by a predetermined program including a series of commands for executing a method of controlling the low pressure fuel pump of the GDI engine, wherein the method comprises:
   receiving an input of failure related information of the high pressure fuel pump;
   boosting, when the high pressure fuel pump is failed based on the failure related information of the high pressure fuel pump, a fuel pressure of the low pressure fuel pump to a first setting pressure; and controlling, when the high pressure fuel pump is not failed, the fuel pressure of the low pressure fuel pump based on a measured fuel pressure with respect to a target fuel pressure of the high pressure fuel pump or a change of a control value of the GDI engine, wherein the control value of the GDI engine is a control value of a spill valve, and wherein the controlling of the fuel pressure of the low pressure fuel pump comprises boosting, when the control value of the spill valve is equal to or lager than a predetermined value, the fuel pressure of the low pressure fuel pump to a second setting pressure.

5. The system of claim 4, wherein the controlling of the fuel pressure of the low pressure fuel pump comprises boosting, when a difference between the measured fuel pressure and the target fuel pressure of the high pressure fuel pump is equal to or lager than a predetermined value, the fuel pressure of the low pressure fuel pump to a third setting pressure.

6. The system of claim 4, wherein the control value of the spill valve is an integral gain value.

* * * * *